United States Patent [19]
Lambert

[11] 3,815,708
[45] June 11, 1974

[54] SURVEY INSTRUMENT TOWER

[75] Inventor: Alfred F. Lambert, Ottawa, Ontario, Canada

[73] Assignee: Canadian Patents and Development Limited, Ottawa, Ontario, Canada

[22] Filed: Mar. 22, 1973

[21] Appl. No.: 343,794

[30] Foreign Application Priority Data
Apr. 14, 1972  Canada................................ 139692

[52] U.S. Cl.................................. 182/129, 182/179
[51] Int. Cl............................................ G01c 15/00
[58] Field of Search........... 182/129, 178, 179, 115; 52/648, 173, 219

[56] References Cited
UNITED STATES PATENTS

| | | | |
|---|---|---|---|
| 2,724,512 | 11/1955 | Fuller | 182/178 |
| 3,181,649 | 5/1965 | Cutter | 182/179 |
| 3,181,650 | 5/1965 | Cutter | 182/179 |
| 3,204,721 | 9/1965 | Park | 182/179 |
| 3,371,458 | 3/1968 | Sturgill | 182/178 |
| 3,780,639 | 12/1973 | Wood | 52/219 |

*Primary Examiner*—Reinaldo P. Machado
*Attorney, Agent, or Firm*—Ronald G. Bitner

[57] ABSTRACT

A lightweight survey instrument tower of the type having an inner instrument supporting structure and an outer operator supporting structure. The instrument supporting structure comprises a tubular member which is secured against rotation by a radius arm at the base. Adjustably attached to the operator supporting structure is one or more yoke assemblies comprising a number of filaments which tangentially contact the outer side of the tubular member to provide resilient lateral support and damping for the instrument supporting tubular member while effectively isolating the tubular member from the operator supporting structure with respect to angular deflection.

9 Claims, 5 Drawing Figures

PATENTED JUN 11 1974 3,815,708

PATENTED JUN 11 1974 3,815,708

SURVEY INSTRUMENT TOWER

This invention relates to a tower for survey instruments and more particularly to a tower for angular measuring instruments.

Instrument towers are used to facilitate distance and angle measurements over obtstructions or over long distances.

One instrument tower, known as the Bilby tower comprises an inner triangular truss structure for supporting the instrument and an outer truss structure for supporting the operator both the inner and outer structures being separately guyed for stability.

Because of its design the known tower has a relatively large mass, particularly the inner instrument supporting structure, which makes it relatively difficult to transport and erect.

According to the present invention the instrument supporting structure is in the form of a lightweight tubular member. It is reconginzed that rotational movement in the instrument support is the major source of error in angular measurement, and that the effects of lateral movements are relatively insignificant. As an example, a lateral displacement of one-eighth inch for a 4 mile line gives a change of 0.01 seconds of arc. The present invention takes advantage of the relatively high torsional rigidity of a tube and its tendency to return to its original position after being disturbed. Moreover, as will be described, the inevitable slight relative movements between the inner and outer members are beneficial in overcoming restraints in the tube supporting means, tending to allow return of the instrument head to its original or equilibrium position.

The invention comprises an instrument tower comprising an outer observer supporting structure, an inner instrument supporting tubular member, means at the upper end of the tubular member for mounting an instrument, bearing means for rotatably securing the lower end of the tubular member with respect to a fixed object, a radius arm having one end connected with the lower end of the tubular member and the other end secured to a fixed object to prevent rotational movement of the tubular member, a yoke assembly mounted on the observer supporting structure near the top end thereof, said yoke assembly comprising at least three filament portions substantially tangentially engaging the tubular member, said yoke assembly providing resilient lateral support and damping means for the tubular member while effectively isolating the tubular member from the operator supporting structure with respect to angular deflection about the vertical axis.

Preferably the yoke assembly includes a frame member for supporting the filament portions and which surrounds the tubular member. In one embodiment the filament portions consist of a single filament laced through the frame member to define two pairs of parallel filament portions, one pair being perpendicular to the other pair.

An embodiment of the invention will be described with reference to the drawings in which.

Figure 1:
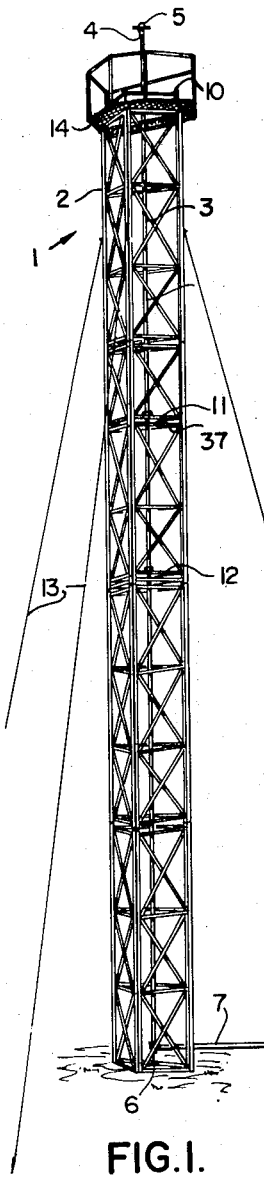
FIG. 1 is a perspective view of a survey instrument tower according to the present invention.

Referring to FIG. 1 the instrument tower 1 comprises an outer observer supporting structure 2 and an instrument supporting tubular member 3. The observer supporting structure 2 is supported by guy wires 13 and has a platform 14 for the operator. The upper end of the tubular member 3 has an adaptor 4 for mounting an instrument 5. The lower end of the tubular member 3 is supported by bearing means 6. A radius arm 7 has one end connected with the lower end of the tubular member 3 and the other end secured to a fixed object at 8 to prevent rotational movement of the tubular member. Yoke assemblies 10, 11 and 12 mounted on the observer supporting structure 2 provide lateral support and damping for the tubular member 3.

Figure 2:
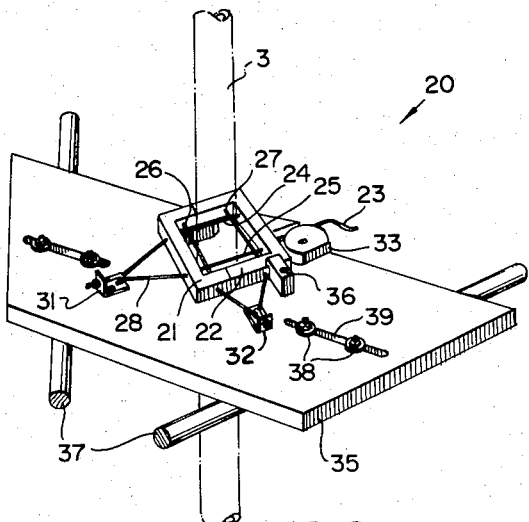
FIG. 2 is a perspective view of one embodiment of a yoke assembly shown mounted on a fragment of the operator supporting structure.
Figure 3:
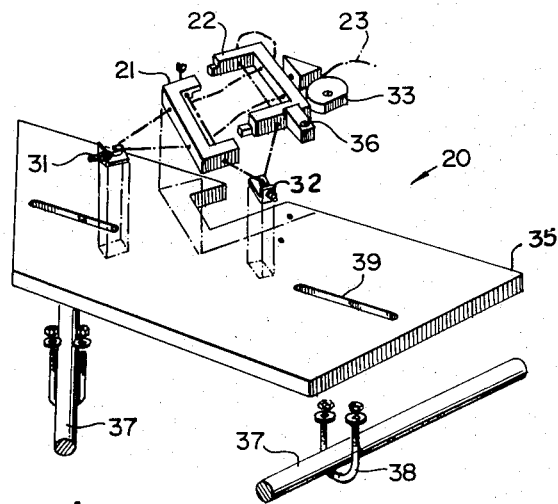
FIG. 3 is an exploded view of the yoke assembly of FIG. 2.

Details of one embodiment of the yoke assembly can be seen in FIGS. 2 and 3. The yoke assembly 20 comprises a pair of sectional frame members 21 and 22 which are mounted on a platform 35 by any suitable means 36. The platform 35 is adjustably secured by bolts 38 and slot 39 to the horizontal members 37 of the observer supporting structure 2. A filament 23, made of nylon, for example, is laced through apertures in the frame members forming two pairs of filament portions 24, 25 and 26, 27 which engage the tubular member 3 and are substantially tangential thereto. Associated with each pair of filament portions are tensioning devices 31 and 32 for adjusting the tension on the filament portions that engage the tubular member 3. The tensioning device, 31 for example, adjusts the tension of filament portion 24 and 25 by means of a common end loop 28. An accentric pawl 33 releasably locks the filament 23 facilitating the separation of the frame members for ease of assembling and disassembling the tower.

Figure 4:
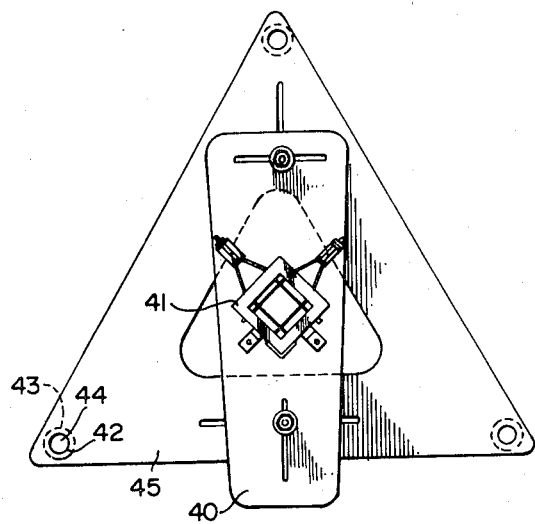
FIG. 4 is a plan view of another embodiment of the yoke assembly.

FIG. 4 shows another embodiment of the yoke assembly with support means which makes it particularly suited as the upper yoke assembly, i.e., yoke assembly 10 of FIG. 1. The platform 40 on which the frame member 41 is attached is adjustably mounted on a second platform 45. The platform 45 rests on three arms 43 extending vertically from the outer operator supporting structure and includes three apertures 42 to receive pins 44 extending from the arms 43.

Figure 5:
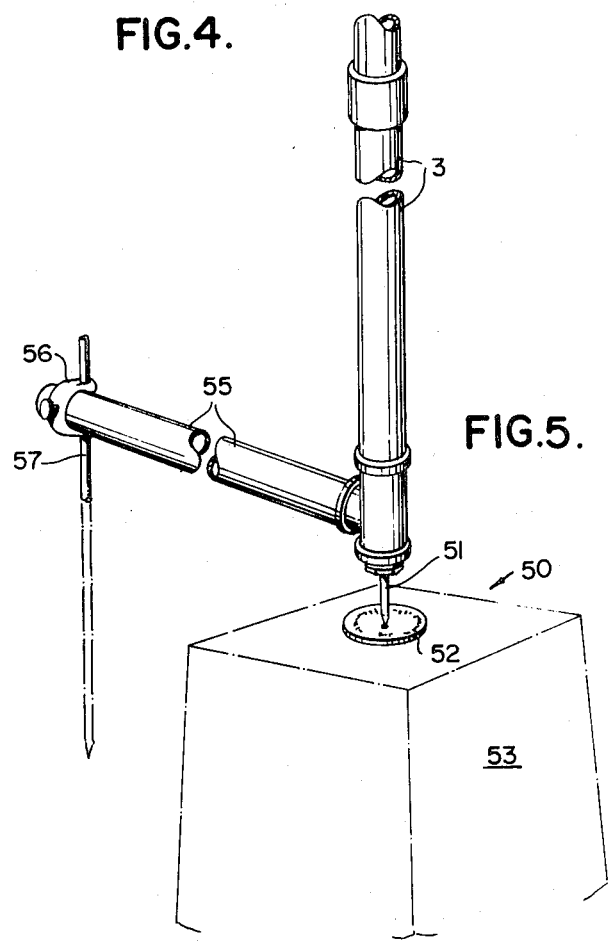
FIG. 5 is a perspective fragmented view showing details of the lower portion of the apparatus of FIG. 1.

Details of the supporting means for the lower end of the tubular member 3 are shown in FIG. 5. Bearing means 50 for the tubular member 3 comprises a pointed shaft 51 extending downward into a concavity in a survey tablet 52 mounted on a concrete pier 53. The bearing means 50 allows rotation but fixes the lower end of the tubular member 3 vertically and laterally. A radius arm 55 has one end connected with the lower end of the tubular member 3 and the other end fixed by clamping means 56 to a stake driven into the earth.

For towers of less than 20 feet one yoke assembly positioned near the top may be adequate for providing lateral support and damping vibrations of the tubular member. The tower of FIG. 1 represents a 40 foot tower and has three yoke assemblies 10, 11 and 12, one being near the top of the operator supporting structure and the others at points approximately at one-half and two-thirds of the tower height.

The filament portions of the yoke assembly perform a number of functions: They provide lateral support for the tubular member keeping it vertical. They damp lateral vibrations in the tubular member caused by wind or disturbances by the instrument operator. The filaments also provide lateral resilience to reduce vibrations being transmitted from the operator supporting structure to the tubular member.

To provide maximum isolation with respect to angular deflections between the tubular member and the operator supporting structure, the filament portions are disposed substantially tangentially to the tubular member 3, very lightly engaging it. More specifically, with reference to FIG. 2, a filament arrangement found to be suitable consisted of having the spacing of holes in the frame members 21 and 22 for each parallel pair of filament portions 24 and 25, and 26 and 27, spaced a distance of one-sixteenth to one-eighth inch less than the diameter of the 2 inch O.D. tubular member 3. The tensioning devices were adjusted to make all filament portions taut. Throughout this specification the use of the phrase "substantially tangential" is intended to include the nonlinear disposition of the filament portions when engaging the tubular member, as in the above example, which is not tangential in the strictest sense.

Although the filament portions only lightly engage the tubular member, the magnitude of the tangential frictional restraining forces imposed by the filament on the tubular member may be significant. Measurements at the top of a 30 foot tower indicated that a tangential force of one-half ounce at the outer surface of a 2 inch O.D. tube, i.e., a couple of ½ ounce inch, can produce angular deflections about a vertical axis of the order of 1 second of arc. However, it appears that such frictional forces between the filament and tubular member, if they exist, are rapidly dissipated due to small lateral oscillations in the tubular member which thereby allow the instrument and tubular member to return to its original orientation.

For tower heights up to 40 feet, a suitable tubular member can be made of 10 foot sections of 2 inch O.D. pipe joined by threaded couplers. The radius bar may also be a inch O.D. pipe 14 feet long connected to the vertical pipe with a Tee-connector. A larger diameter pipe may be used for greater rigidity and is preferable for heights of 50 feet or more. For the operator supporting structure, a commercially available open truss aluminum tower in 10 foot sections and triangular in cross-section, was found to be satisfactory.

With reference to FIG. 1, the preparation for use of the tower involves firstly the erection of the outer operator supporting structure 2 and subsequent erection within it of the inner tubular member 3. The outer structure is guyed vertically over the desired station at 6. Adjustment of the yoke assembly 10 allows precise plumbing of the instrument above the station. Yoke assemblies 11 and 12 are subsequently installed about tubular member 3. A hollow tubular member makes possible optical plumbing with an instrument having such facilities. With the instrument plumbed above the station, the outer end of the radius bar 7 is secured at 8 to fix the orientation of the instrument supporting tubular member. It should be noted that a vertical force on radius bar 7 is translated to a lateral force of the tubular member in the plane common to the tubular member and radius bar, and hence care must be taken in fixing the end of the radius bar at 8 to prevent displacement of the instrument from the vertical in this plane.

A lateral displacement of 0.001 at the end of a 14 foot long radius arm would produce a change of 1.2 seconds in the orientation of the instrument tower and therefore it is evident that the stability of the end of the radius arm at 8 and also the bearing means at 6 is critical for maintaining orientation. For this reason consideration should also be given to shading the radius arm, particularly under changing atmospheric conditions, to avoid the adverse effects of temperature differentials, i.e., whereby a change in curvature of the radius bar would change the orientation of the tubular member.

From repeated observations taken from 20 and 40 foot towers using a Wild T–2 Theodolite, it appears that repeatability of angular measurement is the same order of consistency as that normally obtained with the same instrument on a standard tripod on the ground.

It will be apparent that modification to the embodiment described may be made within the scope of this invention. For example, the number of filament portions in the yoke assembly may be three or more. Further, the structural details of the yoke assembly which supports the filament portion may be modified as well as the adjusting and supporting means. The observer supporting structure may be any suitable means for supporting the operator and the yoke assembly or assemblies.

What is claimed is:

1. An instrument tower comprising an outer observer supporting structure, an inner instrument supporting tubular member, means at the upper end of said tubular member for mounting an instrument, bearing means for rotatably securing the lower end of said tubular member with respect to a fixed object, a radius arm having one end connected with the lower end of said tubular member and the other end secured to a fixed object to prevent rotational movement of said tubular member, a yoke assembly mounted on said observer supporting structure near the top end thereof, said yoke assembly comprising at least three filament portions substantially tangentially engaging said tubular member, said yoke assembly providing resilient lateral support and damping means for said tubular member while effectively isolating said tubular member from said observer supporting structure with respect to angular deflection about the vertical axis.

2. The apparatus of claim 1 including two pairs of parallel filament portions engaging said tubular member, one pair being perpendicular to the other pair.

3. The apparatus of claim 2 having a tensioning device for each pair of parallel filaments.

4. The apparatus of claim 1 wherein said yoke assembly includes a frame member surrounding said tubular member, said frame member supporting said filament portions.

5. The apparatus of claim 4 wherein said filament portions consist of a single filament laced through said frame member.

6. The apparatus of claim 4 wherein said frame member comprises a pair of separable sections.

7. The apparatus of claim 1 wherein said yoke assembly is horizontally adjustable relative to said observer supporting structure.

8. The apparatus of claim 1 wherein the outer observer supporting structure consists of a sectional open truss structure triangular in cross-section and having an observer supporting platform.

9. The apparatus of claim 5 wherein said tubular member comprises a plurality of interconnecting sections.

* * * * *